United States Patent
Ikuta et al.

(10) Patent No.: US 10,894,523 B2
(45) Date of Patent: Jan. 19, 2021

(54) CRASH BOX AND ITS MANUFACTURING METHOD

(71) Applicant: TOYOTA JIDOSHA KABUSHIKI KAISHA, Toyota (JP)

(72) Inventors: Hiroyuki Ikuta, Nissin (JP); Yu Takanezawa, Nissin (JP); Rikuto Takagi, Toyota (JP); Mitsutaka Yoshida, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/149,526

(22) Filed: Oct. 2, 2018

(65) Prior Publication Data
US 2019/0135211 A1    May 9, 2019

(30) Foreign Application Priority Data

Nov. 6, 2017    (JP) .................................. 2017-214043

(51) Int. Cl.
*B60R 19/34*    (2006.01)
*B23K 26/08*    (2014.01)
(Continued)

(52) U.S. Cl.
CPC .......... *B60R 19/34* (2013.01); *B23K 26/0006* (2013.01); *B23K 26/082* (2015.10);
(Continued)

(58) Field of Classification Search
CPC .................................................... B60R 19/34
See application file for complete search history.

(56) References Cited

U.S. PATENT DOCUMENTS 2,751,289 A * 6/1956 Elliott ...................... C22C 1/08
                                                              75/415
3,214,265 A * 10/1965 Fiedler ...................... C22C 1/08
                                                              75/415
(Continued)

FOREIGN PATENT DOCUMENTS

CA    2422415 A1 *  9/2003 ............. A42B 3/063
DE    10158627 A1 *  6/2003 ............. B60J 5/0444
(Continued)

OTHER PUBLICATIONS

Metal Forms for Improved Crash Energy Absorption in Passenger Equipment, Kenneth Kremer, Sep. 2004 http://onlinepubs.trb.org/onlinepubs/archive/studies/idea/finalreports/highspeedrail/hsr-34final_report.pdf (Year: 2004).*

(Continued)

*Primary Examiner* — Hilary L Gutman
(74) *Attorney, Agent, or Firm* — Oblon, McClelland, Maier & Neustadt, L.L.P.

(57) ABSTRACT

A crash box capable of easily deforming into a bellows shape and absorbing impact energy more reliably, and its manufacturing method are provided. The present disclosure is applied to a crash box which is partly deformed in an axial direction to absorb impact energy when the crash box receives an impact in the axial direction. A first layer made of metal and a second layer made of metal containing a larger volume of bubbles than that of the first layer are alternately formed in the axial direction in the crash box according to the present disclosure.

5 Claims, 9 Drawing Sheets

(51) Int. Cl.
  *B23K 26/082*  (2014.01)
  *B23K 26/00*   (2014.01)
  *B33Y 10/00*   (2015.01)
  *B33Y 80/00*   (2015.01)
  *B23K 26/342*  (2014.01)
  *F16F 7/00*    (2006.01)
  *B23K 101/04*  (2006.01)
  *B23K 103/18*  (2006.01)
  *B23K 101/00*  (2006.01)

(52) U.S. Cl.
  CPC ........ *B23K 26/0869* (2013.01); *B23K 26/342* (2015.10); *B33Y 10/00* (2014.12); *B33Y 80/00* (2014.12); *F16F 7/003* (2013.01); *B23K 2101/006* (2018.08); *B23K 2101/04* (2018.08); *B23K 2103/18* (2018.08); *F16F 2224/0208* (2013.01); *F16F 2224/0233* (2013.01); *F16F 2226/04* (2013.01)

(56) References Cited

U.S. PATENT DOCUMENTS

| | | | | |
|---|---|---|---|---|
| 3,224,846 | A * | 12/1965 | Fiedler | C22C 1/08 428/613 |
| 3,378,296 | A * | 4/1968 | Crocker | B60R 19/44 293/142 |
| 3,933,387 | A * | 1/1976 | Salloum | B60R 19/18 293/120 |
| 4,148,505 | A * | 4/1979 | Jensen | B62D 21/152 280/784 |
| 4,174,014 | A * | 11/1979 | Bjorksten | B60K 1/04 180/68.5 |
| 5,052,732 | A * | 10/1991 | Oplet | B60R 19/00 188/377 |
| 6,062,632 | A * | 5/2000 | Brachos | B60R 19/00 296/187.03 |
| 6,698,331 | B1 * | 3/2004 | Yu | F41H 5/0442 428/613 |
| 2006/0071488 | A1 * | 4/2006 | Guinehut | B60R 19/22 293/133 |
| 2008/0001416 | A1 * | 1/2008 | Chaudhari | B60R 19/18 293/120 |
| 2011/0101714 | A1 * | 5/2011 | Bator | B60R 19/18 293/132 |
| 2012/0073884 | A1 * | 3/2012 | Guthrie | B60G 11/00 177/225 |
| 2015/0307044 | A1 * | 10/2015 | Hundley | B60R 19/18 293/120 |
| 2015/0321289 | A1 * | 11/2015 | Bruck | B05D 3/0254 427/554 |
| 2016/0090056 | A1 * | 3/2016 | Hundley | B60R 19/18 293/120 |
| 2017/0051806 | A1 * | 2/2017 | Kang | F16F 7/12 |
| 2017/0274848 | A1 * | 9/2017 | Renegar | B60R 13/0861 |
| 2018/0257587 | A1 * | 9/2018 | Faruque | B60R 19/18 |
| 2019/0152413 | A1 * | 5/2019 | Renegar | B60R 19/00 |

FOREIGN PATENT DOCUMENTS

| | | | | |
|---|---|---|---|---|
| EP | 1097853 | A2 * | 5/2001 | ............ B60R 19/22 |
| FR | 2889136 | A1 * | 2/2007 | ............ B60R 19/34 |
| JP | 7-145843 | | 6/1995 | |
| WO | WO-2012025166 | A1 * | 3/2012 | ............... B60K 1/04 |

OTHER PUBLICATIONS

Merriam Webster's Online Dictionary for 'integral' https://www.merriam-webster.com/dictionary/integral (Year: 2019).*

* cited by examiner

90

CRASH BOX AND ITS MANUFACTURING METHOD

CROSS REFERENCE TO RELATED APPLICATIONS

This application is based upon and claims the benefit of priority from Japanese patent application No. 2017-214043, filed on Nov. 6, 2017, the disclosure of which is incorporated herein in its entirety by reference.

BACKGROUND

The present disclosure relates to a crash box and its manufacturing method.

A vehicle is provided with a crash box which is partly deformed in an axial direction to absorb impact energy when the crash box receives an impact in the axial direction.

As an example of a crash box, Japanese Unexamined Patent Application Publication No. H7-145843 discloses a technique in which a soft part, which serves as a starting point of a bellows-shape deformation, is formed in a crash box by applying heat to a part of the crash box and thereby softening the part of the crash box.

SUMMARY

However, as explained above, in the crash box disclosed in Japanese Unexamined Patent Application Publication No. H7-145843, heat is applied to a part of the crash box so as to form a soft part therein. Therefore, the heat is also conducted to parts surrounding the soft part through thermal conduction and hence a boundary between the soft part and its surrounding parts could become indefinite. Thus, there is a problem that the crash box disclosed in Japanese Unexamined Patent Application Publication No. H7-145843 is less likely to be deformed into a bellows shape by using the soft part as a starting point of the deformation, and therefore the crash box may not be able to reliably absorb impact energy.

The present disclosure has been made to solve the above described problem and provides a crash box capable of easily deforming into a bellows shape and absorbing impact energy more reliably, and its manufacturing method.

One aspect of the present disclosure is a crash box configured so that a part of the crash box is deformed in an axial direction and thereby absorbs impact energy when the crash box receives an impact in the axial direction, in which a first layer made of metal and a second layer made of metal containing a larger volume of bubbles than that of the first layer are alternately formed in the axial direction.

Another aspect of the present disclosure is a manufacturing method of a crash box, the crash box being configured so that a part of the crash box is deformed in an axial direction and thereby absorbs impact energy when the crash box receives an impact in the axial direction, the manufacturing method including alternately performing:

a first step of forming a first layer by irradiating a metal powder with a laser and thereby curing the metal powder; and a second step of forming a second layer by irradiating a metal powder with a laser and thereby curing the metal powder by using a smaller amount of heat-input energy for the laser than that used in the first step, so that the first layer and the second layer are alternately formed in the axial direction.

According to the above described aspects, it is possible to provide an advantageous effect that a crash box capable of easily deforming into a bellows shape and absorbing impact energy more reliably, and its manufacturing method.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments of the present disclosure are described hereinafter with reference to the drawings. Note that in each drawing described hereinafter, the same or corresponding elements are denoted by the same reference symbols, and the redundant explanation is omitted when necessary in order to clarify the explanation. Further, specific numerical values or the like shown in embodiments hereinafter are merely examples to facilitate understanding of the disclosure and the disclosure is not limited to them.

(Structure of Crash Box)

Figure 1:
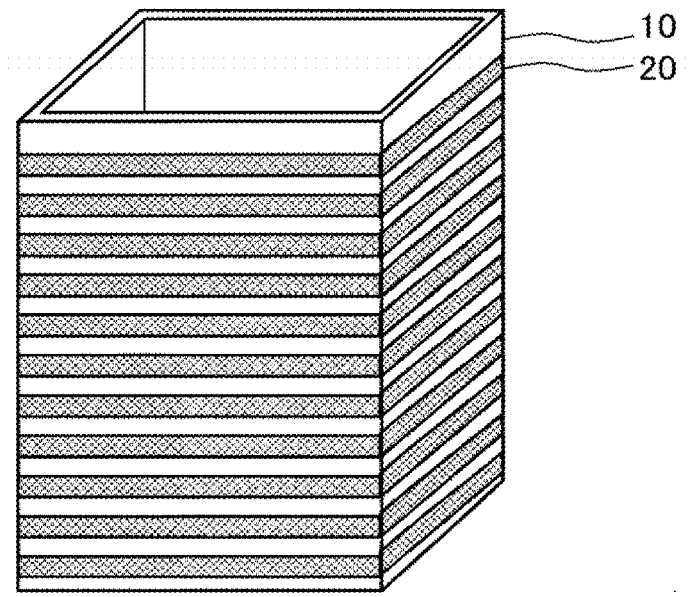
FIG. 1 is a perspective view showing a structure of a crash box according to an embodiment.

First, a structure of a crash box 1 according to this embodiment is described with reference to FIG. 1. FIG. 1 is a perspective view showing a structure of the crash box 1 according to this embodiment.

As shown in FIG. 1, the crash box 1 according to this embodiment has a cylindrical body in which bulk layers (first layers) 10 and porous layers (second layers) 20 containing a larger volume (e.g., a larger number, a larger size, etc.) of bubbles than that of the bulk layers 10 are alternately formed. Specifically, the bulk layers 10 and the porous layers 20 are alternately stacked in the axial direction (vertical direction in FIG. 1) of the cylindrical body.

It is assumed that the crash box 1 will receive an impact in the axial direction and therefore it is mounted on a front or rear part of a vehicle in such a position that its axial direction is in parallel with a longitudinal direction of the vehicle. For example, one end in the axial direction of the crash box 1 is attached to a bumper reinforcement of the vehicle and the other end in the axial direction is attached to a side member of the vehicle.

The crash box 1 has a cylindrical body including a hollow part penetrating the crash box 1 in the axial direction. A cross section of the crash box 1 is rectangular in FIG. 1, but is not limited to this shape. Instead of the rectangular shape, the cross section of the crash box 1 may have a polygonal shape other than rectangular, a circular shape or the like. Further, the cross section of the crash box 1 may have a shape in which a notch is formed in a part of a side wall thereof. Further, although the crash box 1 is composed of one cylindrical body in FIG. 1, it is not limited to this structure. That is, the crash box 1 may be composed of a plurality of cylindrical bodies, in which outer walls of the plurality of cylindrical bodies are connected with each other.

Figure 2:
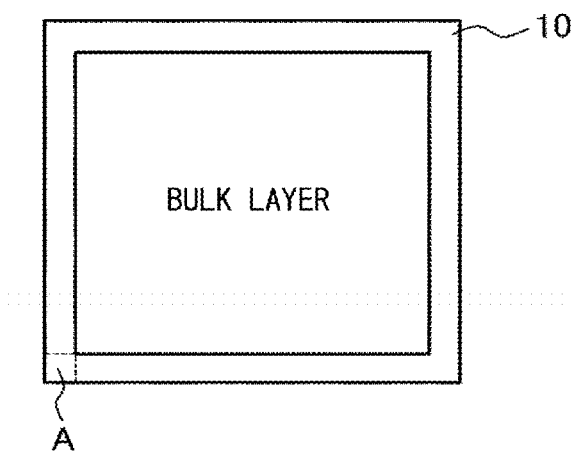
FIG. 2 is a horizontal cross-sectional diagram showing a cross section of a bulk layer on a plane perpendicular to an axial direction according to an embodiment.
Figure 3:
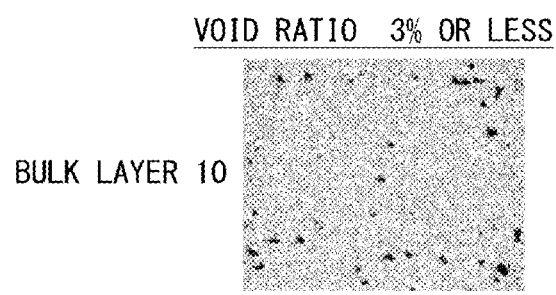
FIG. 3 is an enlarged view of a region A in FIG. 2.
Figure 4:
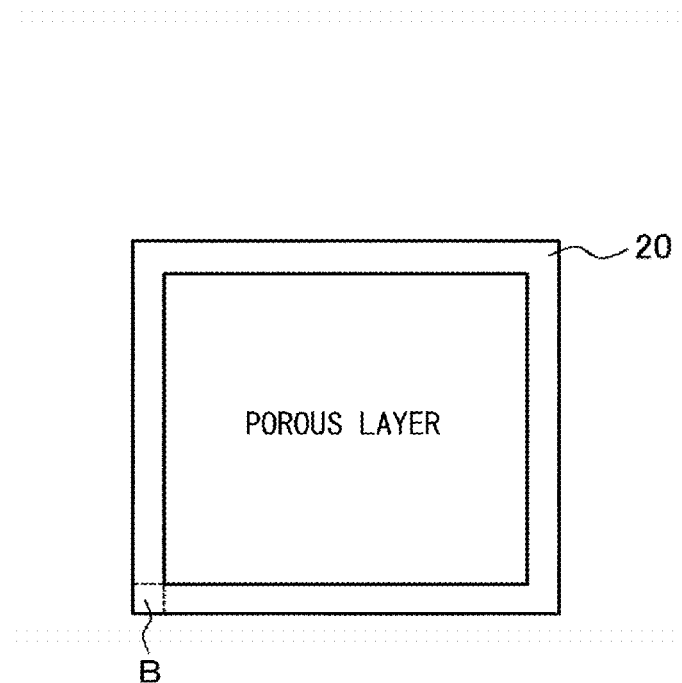
FIG. 4 is a horizontal cross-sectional diagram showing a cross section of a porous layer on a plane perpendicular to an axial direction according to an embodiment.
Figure 5:
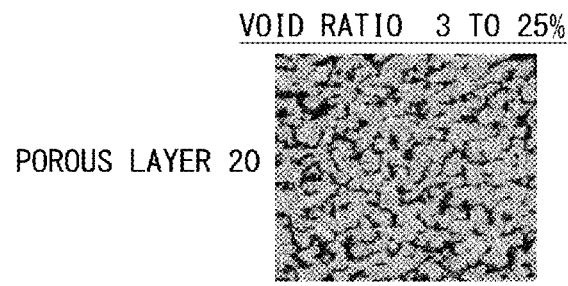
FIG. 5 is an enlarged view of a region B in FIG. 4.

Next, the bulk layer 10 and the porous layer 20 according to this embodiment are described in detail with reference to FIGS. 2 to 5. FIG. 2 is a horizontal cross-sectional diagram showing a cross section of the bulk layer 10 on a plane perpendicular to the axial direction according to this embodiment and FIG. 3 is an enlarged view of a region A in FIG. 2. Further, FIG. 4 is a horizontal cross-sectional diagram showing a cross section of the porous layer 20 on a plane perpendicular to the axial direction according to this embodiment and FIG. 5 is an enlarged view of a region B in FIG. 4.

As shown in FIGS. 2 and 3, each bulk layer 10 contains a small volume of bubbles and a void ratio (volume ratio of bubbles contained in a unit volume (the same applies to the following descriptions)) of each of the bulk layers 10 is 3 [%] or less. Note that in FIG. 3, blackish parts are bubbles (the same applies to FIG. 5). Further, as shown in FIGS. 4 and 5, each of the porous layers 20 contains a larger volume of bubbles than that of each of the bulk layers 10 and the void ratio of each of the porous layers 20 is 3 to 25 [%].

When the crash box 1 is mounted on a vehicle, a porous layer 20 which is farther from the center of the vehicle contains a larger volume of bubbles than that of the other porous layer 20 which is closer to the center of the vehicle. In other words, the void ratio of the porous layer 20 which is farther from the center of the vehicle is made higher than that of the porous layer 20 which is closer to the center of the vehicle. The void ratios of the porous layers 20 may be increased in a stepwise manner as their respective distances from the center of the vehicle increase. Alternatively, the porous layers 20 are divided into a plurality of groups according to their respective distances from the center of the vehicle. Then, the void ratios of the porous layers 20 may be increased in such a manner that the farther a group is located from the center of the vehicle, the higher the void ratios of porous layers 20 in that group becomes. Note that the respective values of the void ratios of the porous layers 20 in the same group are set to be the same value.

The bulk layers 10 and the porous layers 20 are made of metal and integrally formed by a three-dimensional (3D) forming apparatus such as a 3D printer using a metal powder as described later. Metal of which the bulk layers 10 and the porous layers 20 are made is, for example, Al-based metal, Fe-based metal, Ti-based metal and the like, but is not limited to these kinds of metal.

Figure 6:
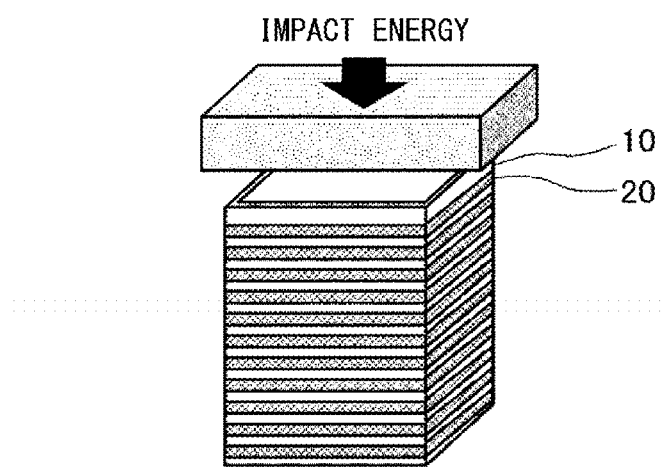
FIG. 6 shows a state of a crash box according to an embodiment before it receives an impact.

Next, a state when the crash box 1 according to this embodiment receives an impact is described with reference to FIGS. 6 and 7. FIG. 6 shows a state of the crash box 1 according to this embodiment before it receives an impact and FIG. 7 shows a state of the crash box 1 according to this embodiment after it receives an impact.

As shown in FIG. 6, in this example, it is assumed that the crash box 1 receives an impact from above in FIG. 6 in the axial direction. Therefore, it is assumed that one end of the crash box 1 in the upper part of FIG. 6 is attached to a bumper reinforcement of a vehicle which is farther from the center of the vehicle and the other end of the crash box 1 in the lower part of FIG. 6 is attached to the side member which is closer to the center of the vehicle. Further, the porous layer 20 in the upper part of FIG. 6 has a higher void ratio and contains a larger volume of bubbles than the void ratio and the volume of bubbles of the porous layer 20 in the lower part of FIG. 6.

The crash box 1 has a structure in which the bulk layers 10 and the porous layers 20 are alternately formed in the axial direction. Since the porous layer 20 contains a larger volume of bubbles than that of the bulk layer 10, the porous layer 20 is deformed more easily. Further, since the porous layer 20 in the upper part of FIG. 6 has a larger volume of bubbles than that of the porous layer 20 in the lower part of FIG. 6, the porous layer 20 in the upper part of FIG. 6 is deformed more easily.

Figure 7:
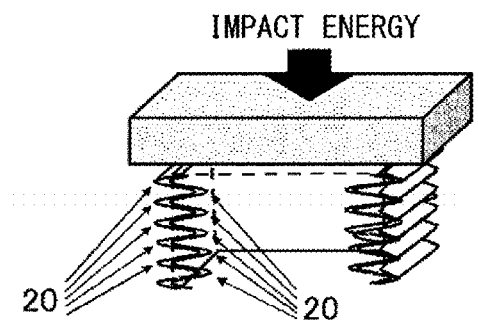
FIG. 7 shows a state of a crash box according to an embodiment after it receives an impact.

For the above reason, as shown in FIG. 7, the crash box 1 starts to be deformed starting from the porous layers 20 when it receives an impact from above in FIG. 7. More specifically, the porous layers 20 are deformed in order starting from the porous layer 20 containing a larger volume of bubbles located in the upper part of FIG. 7. As a result, the crash box 1 is deformed into a bellows shape starting from the upper part and then proceeding toward the lower part in FIG. 7 without being broken (e.g., being snapped) during the process. Further, bulk layers 10 are formed on both sides of each of the porous layers 20 in the axial direction. Therefore, when the porous layer 20 is deformed, the bulk layers 10 located on both sides of the deformed porous layer 20 in the axial direction come into contact with each other through the deformed porous layers 20 and thereby absorb impact energy.

Figure 8:
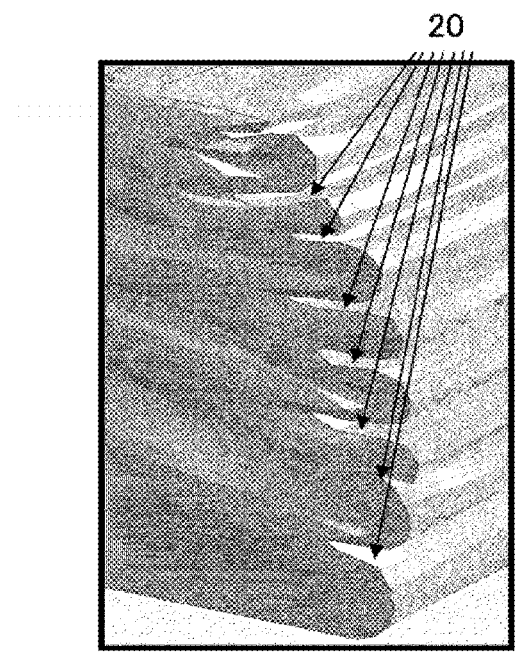
FIG. 8 is a drawing showing a result of an analysis of a part of a crash box according to an embodiment, deformed into a bellows shape by using CAE.

A state of a part of the crash box 1 according to this embodiment deformed into a bellows shape is described in detail with reference to FIG. 8. FIG. 8 is a drawing showing a result of analyzing a part deformed into a bellows shape of the crash box 1 according to this embodiment by using Computer Aided Engineering (CAE). Note that FIG. 8 corresponds to a cross-sectional diagram showing a cross section of a part of the crash box 1 deformed into a bellows shape on a plane parallel to the axial direction.

It will be understood from FIG. 8 that the porous layers 20 are deformed in order starting from the porous layer 20 containing a larger volume of bubbles located in the upper part of FIG. 8 and a plurality of bellows are formed since the crash box 1 receives an impact from above in FIG. 8. Further, it will be understood from FIG. 8 that walls of the formed bellows, in other words, the bulk layers 10 located on the upper and lower sides of the deformed porous layer 20 come into contact with each other through the deformed porous layer 20.

Note that design parameters of the crash box 1 can be determined by using the CAE. For example, it is assumed that design parameters are void ratios of the bulk layer 10 and the porous layer 20, a thickness of a stack indicating a thickness of the porous layers 20 in the axial direction, a pitch of the stack indicating an interval between each of the porous layers 20 in the axial direction, etc.

For example, a method of determining a design parameter(s) of the crash box 1 by using the CAE is as follows.

1) First, by using the CAE, a simulation of a falling weight test is performed in a state where a design parameter(s) is set to an initial value(s), and projections/depressions, positions and the like of bellows are predicted.
2) Next, by using the CAE, the design parameter(s) is adjusted and the simulation of the falling weight test is performed again with the adjusted parameter(s).
3) When target absorption energy cannot be obtained in the result of the simulation, the adjustment of the design parameter(s) and the simulation of the falling weight test in the step 2) are repeatedly performed until the target absorption energy can be obtained.

In this embodiment as described above, the bulk layers 10 and the porous layers 20 are alternately formed in the axial direction in the crash box 1 and the porous layers 20 contains a larger volume of bubbles than that of the bulk layers 10. Thus, since the porous layers 20 are deformed more easily than the bulk layers 10, the crash box 1 starts to be deformed from the porous layers 20 and hence is easily deformed into a bellows shape. Further, the bulk layers 10 are formed on both sides of each porous layer 20 in the axial direction. Therefore, when the porous layer 20 is deformed, the bulk layers 10 located on both sides of the deformed porous layer 20 in the axial direction come into contact with each other through the deformed porous layer 20 and thereby can absorb impact energy more reliably.

Further, when the crash box 1 is mounted on a vehicle, a porous layer 20 which is farther from the center of the vehicle contains a larger volume of bubbles than that of the other porous layer 20 which is closer to the center of the vehicle. Therefore, the porous layers 20 are deformed in order starting from one located on the side farthest from the center of the vehicle. Therefore, it is possible to prevent the crash box 1 from being broken (e.g., being snapped) during the process. Thus, the crash box 1 can absorb impact energy more reliably.

Further, the crash box 1 has a structure in which the bulk layers 10 and the porous layers 20 containing a large volume of bubbles larger than that of the bulk layers 10 are alternately formed. Therefore, the weight of the crash box 1 can be reduced. Further, the crash box 1 is integrally formed by a 3D forming apparatus such as a 3D printer using a metal powder as described later. Therefore, the manufacturing process of the crash box 1 can be simplified and the manufacturing cost can be reduced.

(Manufacturing Method of Crash Box)

Next, a manufacturing method of a crash box 1 according to this embodiment is described. A 3D forming apparatus such as a 3D printer is used in the manufacturing method of the crash box 1 according to this embodiment.

The 3D forming apparatus forms a 3D object by forming each of a plurality of cross-sectional slices, which are defined by slicing the 3D object into cross-sectional slices parallel to each other, and stacking these cross-sectional slices on each other.

In the 3D forming apparatus, for example, a selective laser melting method or a laser metal deposition method can be used as a method of forming the cross-sectional slices. The selective laser melting method is a method for melting and curing a powder in a necessary part by laying layers of the powder on a stage each other and irradiating the necessary part with a laser. In contrast, the laser metal deposition method is a method for melting and curing a powder by supplying a powder to a necessary part and at the same time irradiating the powder with a laser.

In the manufacturing method of the crash box 1 according to this embodiment, a forming position of the crash box 1 is determined so that its axial direction becomes parallel to the vertical direction (i.e., the position shown in FIG. 1). Then, the crash box 1 is manufactured by forming each of a plurality of cross-sectional slices, which are defined by slicing the crash box 1 into cross-sectional slices parallel to each other, and stacking these cross-sectional slices on each other. Note that each cross-sectional slice corresponds to one of slices obtained by slicing the crash box 1 on boundary surfaces between the bulk layers 10 and the porous layers 20. Thus, the bulk layers 10 and the porous layers 20 are alternately formed as cross-sectional slices and they are stacked on each other.

That is, in the manufacturing method of the crash box 1 according to this embodiment, a step of forming a bulk layer 10 (first step) and a step of forming a porous layer 20 (second step) are alternately performed. Further, in both steps, layers are formed from a metal powder by using the selective laser melting method or the laser metal deposition method described above.

However, a condition for the laser irradiation (scanning speed of a laser, irradiation intensity of the laser, a part irradiated with the laser, etc.) is changed between when the bulk layer 10 is formed and when the porous layer 20 is formed. Specifically, when the porous layer 20 is formed, the condition for the laser irradiation is changed so that the porous 20 is formed by using a smaller amount of heat-input energy for the laser than that used when the bulk layer 10 is formed. Examples of the condition for the laser irradiation using a smaller amount of heat-input energy for the laser include increasing a scanning speed of the laser, decreasing the irradiation intensity of the laser, and leaving parts of the porous layer un-irradiated with the laser, etc. However, when the condition for the laser irradiation is changed, all of the scanning speed, the irradiation intensity and the irradiated part do not need to be changed. That is, at least one of them may be changed.

Figure 9:
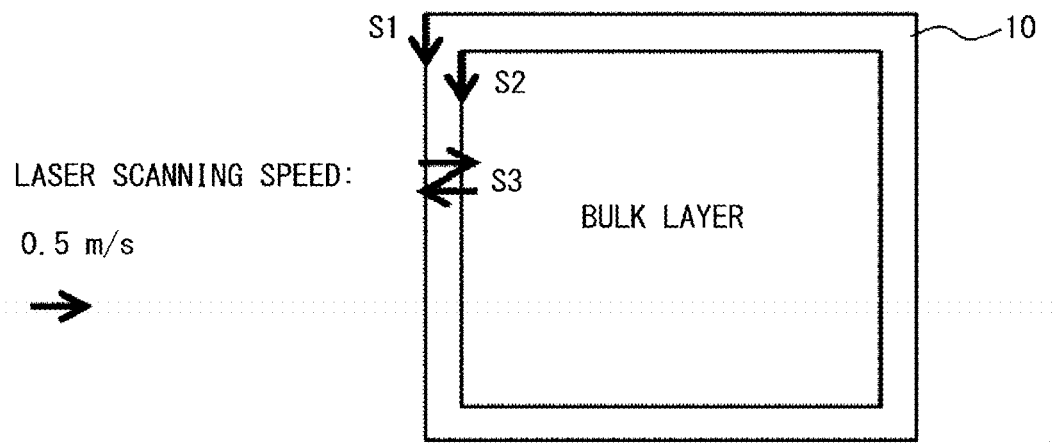
FIG. 9 is a top view showing a bulk layer during its forming process in a manufacturing method of a crash box according to an embodiment.

Next, the condition for the laser irradiation performed in the manufacturing method of the crash box 1 according to this embodiment is described in detail with reference to FIGS. 9 and 10. In this example, a scanning speed of a laser is changed between when the bulk layer 10 is formed and when the porous layer 20 is formed. FIG. 9 is a top view showing the bulk layer 10 during its forming process in the manufacturing method of the crash box 1 according to the embodiment and FIG. 10 is a top view showing the porous layer 20 during its forming process in the manufacturing method of the crash box 1 according to the embodiment.

As shown in FIG. 9, when the bulk layer 10 is formed, firstly its outer edge is scanned with a laser (S1), and secondly its inner edge is scanned with a laser (S2). Lastly, its planar part (the part between the outer edge and the inner edge) is scanned (S3). Note that this scanning order is an example and the scanning order is not limited to this order. In this process, a scanning speed of the laser is set to a slower speed, e.g., to 0.5 [m/s] and hence heat-input energy of the laser is increased.

Figure 10:
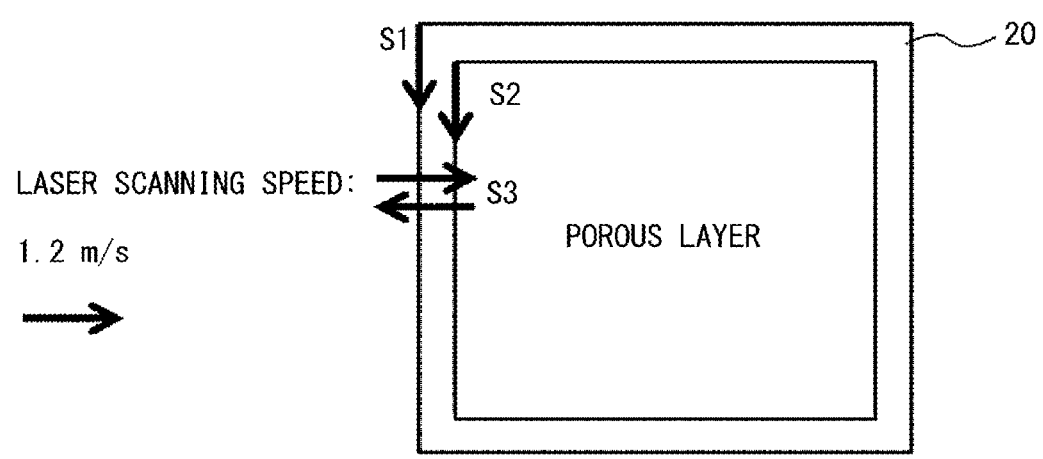
FIG. 10 is a top view showing a porous layer during its forming process in a manufacturing method of a crash box according to an embodiment.

Meanwhile, when the porous layer 20 is formed, a scanning order is the same as that for the bulk layer 10 (S1, S2 and S3) as shown in FIG. 10. However, the scanning speed of the laser is set to 1.2 [m/s], which is higher than that for the bulk layer 10 and hence the heat-input energy is decreased. Thus, when the porous layer 20 is formed, many unmolten parts of a metal powder are intentionally formed by decreasing the heat-input energy of the laser. Therefore, a large volume of bubbles are generated when the porous layer 20 is cured.

In this embodiment as described above, the step of forming a bulk layer 10 and the step of forming a porous layer 20 are alternately performed and thereby the bulk layer 10 and the porous layer 20 are alternately formed in the axial direction. Note that when the porous layer 20 is formed, it is formed by using a smaller amount of heat-input energy for the laser than that used when the bulk layer 10 is formed. Therefore, since the bulk layer 10 is formed by using a large amount of heat-input energy for the laser, the metal powder is intensely melted and hence the volume of bubbles that are generated when the bulk layer 10 is cured is decreased. On the contrary, since the porous layer 20 is formed by using a small amount of heat-input energy for the laser, many unmolten parts of the metal powder are formed and hence a large volume of bubbles are generated when the porous layer 20 is cured. Therefore, the bulk layer 10 containing a small volume of bubbles and the porous layer 20 containing a large volume of bubbles can be alternately formed in the crash box 1. Thus, it is possible to easily manufacture a crash box 1 in an integral manner. Further, the manufactured crash box 1 can start to be deformed from the porous layer 20 and hence is easily deformed into a bellows shape, and thereby absorb impact energy more reliably.

(Example of Crash Box)

Figure 11:
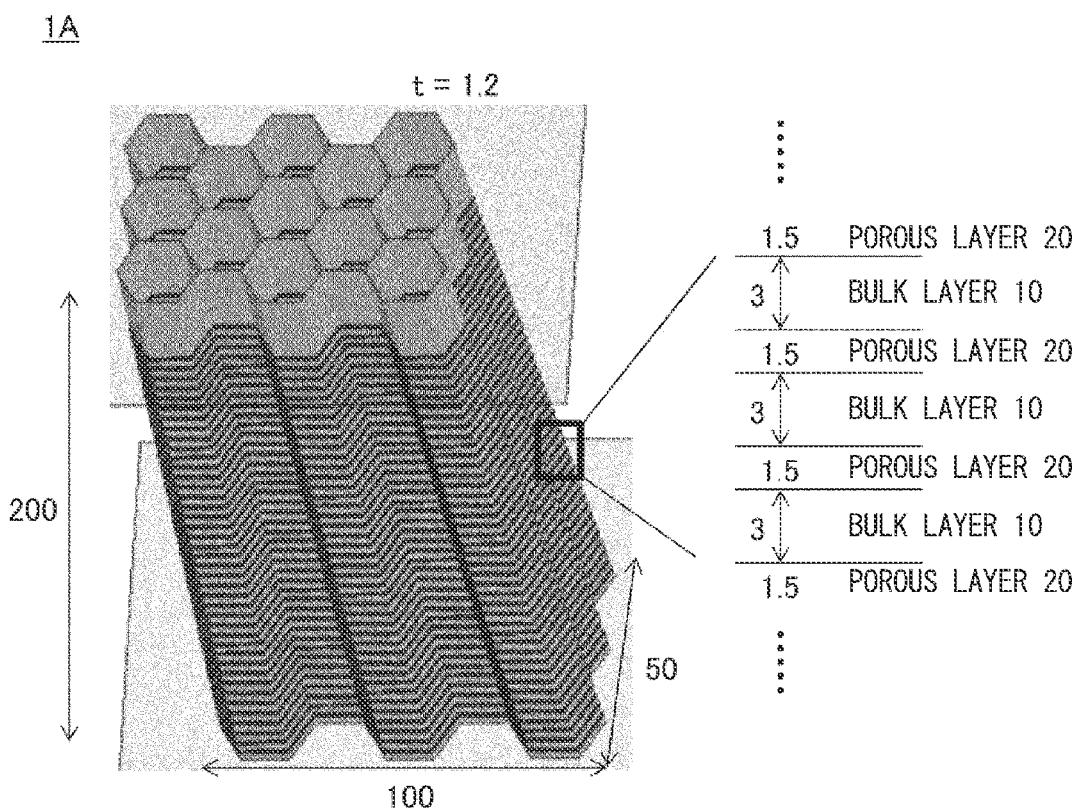
FIG. 11 is a perspective view showing a structure of a crash box according to an example.

Next, a specific example of a crash box 1 according to this embodiment is described with reference to FIG. 11. FIG. 11 is a perspective view showing a structure of a crash box 1A according to this example.

As shown in FIG. 11, the crash box 1A according to this example is composed of a plurality of cylindrical bodies (13 bodies in FIG. 11) whose cross sections are hexagonal. Further, the plurality of cylindrical bodies are arranged in a honeycomb configuration and their outer walls are connected with each other. Each of the plurality of cylindrical bodies has a structure in which bulk layers 10 and porous layers 20 are alternately stacked in the axial direction (vertical direction in FIG. 11) of the cylindrical bodies.

In this example, it is assumed that a void ratio of the bulk layer 10 is set to 1 [%] or less and a void ratio of the porous layer 20 is set to 10 to 15 [%]. Further, it is assumed that when the crash box 1A is mounted on a vehicle, one end of the crash box 1A in the upper part of FIG. 11 is attached to a bumper reinforcement which is farther from the center of the vehicle and the other end of the crash box 1A in the lower part of FIG. 11 is attached to the side member which is closer to the center of the vehicle. Further, the porous layer 20 in the upper part of FIG. 11 has a higher void ratio and contains a larger volume of bubbles than the void ratio and the volume of bubbles of the porous layer 20 in the lower part of FIG. 11.

Further, it is assumed that thicknesses of stacks in the axial direction of the bulk layer 10 and the porous layer 20 are 3 [mm] and 1.5 [mm], respectively, and that wall thicknesses t of outer edges of both of the bulk layer 10 and the porous layer 20 are 1.2 [mm]. Further, it is assumed that the overall height of the crash box 1A in the axial direction is 200 [mm]. Further, it is assumed that the overall length and the width of the crash box 1A on a plane perpendicular to the axial direction are 100 [mm] and 50 [mm], respectively.

Further, it is assumed that the bulk laser 10 and the porous laser 20 are formed by using a 3D forming apparatus and using the selective laser melting method. Further, it is assumed that a metal powder is made of Al-10Si—Mg and its grain diameter is 20 to 30 [μm].

Further, it is assumed that when the bulk layer 10 is formed, a layer of the metal powder is laid so that its height becomes 50 [μm] and then the layer of the metal powder is irradiated with a laser. Further, it is assumed that irradiation intensity of the laser is set to 350 [W] and a scanning speed is set to 0.5 [m/s].

Further, it is assumed that when the porous layer 20 is formed, a layer of the metal powder is laid so that its height becomes 75 [μm] and then the layer of the metal powder is irradiated with a laser. Further, it is assumed that an irradiation intensity of the laser is set to 500 [W] and a scanning speed is set to 1.2 [m/s].

Figure 12:
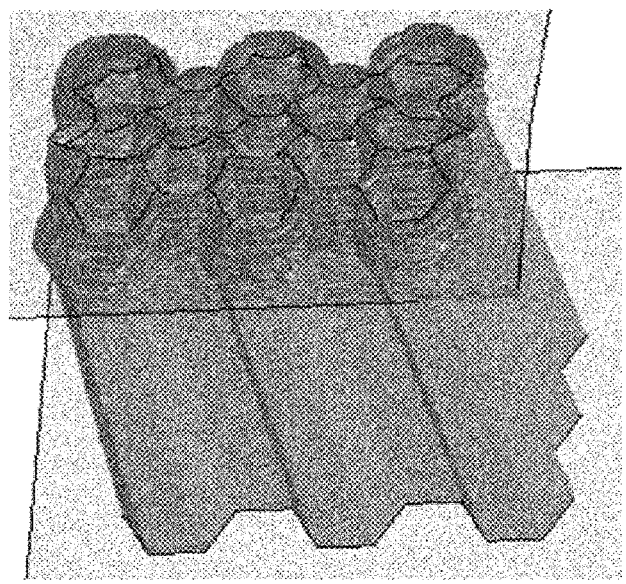
FIG. 12 shows a state of a crash box according to an example after it receives an impact.
Figure 13:
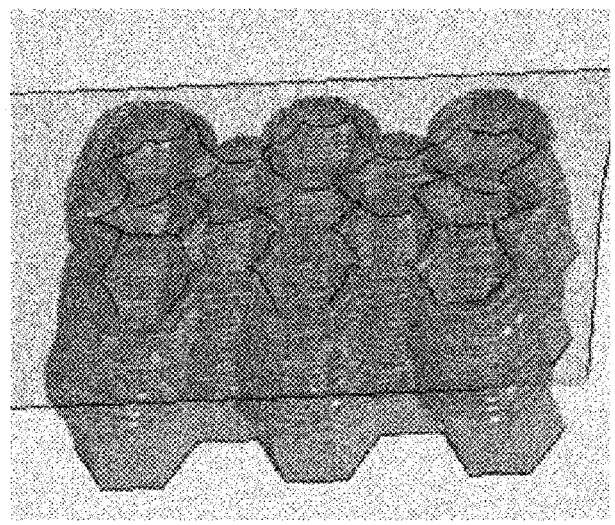
FIG. 13 shows a state of a crash box according to an example after it receives an impact.

Next, a state when the crash box 1A according to this example receives an impact is described with reference to FIGS. 12 and 13. FIGS. 12 and 13 show a state of the crash box 1A according to this example after it receives an impact. It is assumed that first the crash box 1A is deformed to the state in FIG. 12 and then is deformed to the state in FIG. 13.

The crash box 1A has a structure in which the bulk layers 10 and the porous layers 20 are alternately formed in the axial direction. Since the porous layer 20 contains a larger volume of bubbles than that of the bulk layer 10, the porous layer 20 is deformed more easily. Further, since a porous layer 20 in the upper sections of FIGS. 12 and 13 has a larger volume of bubbles than that of a porous layer 20 in the lower sections of FIGS. 12 and 13, the porous layer 20 in the upper sections of FIGS. 12 and 13 is deformed more easily than the porous layer 20 in the lower sections of FIGS. 12 and 13.

For the above reason, as shown in FIGS. 12 and 13, the porous layers 20 are deformed in order starting from a porous layer 20 containing a larger volume of bubbles located in the upper sections of FIGS. 12 and 13 when the crash box 1A receives an impact from above in FIGS. 12 and 13. Further, the crash box 1A is firstly deformed to the state in FIG. 12 and then is deformed to the state in FIG. 13. As a result, the crash box 1A is deformed into a bellows shape starting from the upper sections and then toward the lower sections in FIGS. 12 and 13 without being broken (e.g., being snapped) during the process. Further, when the porous layer 20 is deformed, the bulk layers 10 located on both sides of the deformed porous layer 20 in the axial direction come into contact with each other through the deformed porous layer 20 and thereby absorb impact energy.

Figure 14:
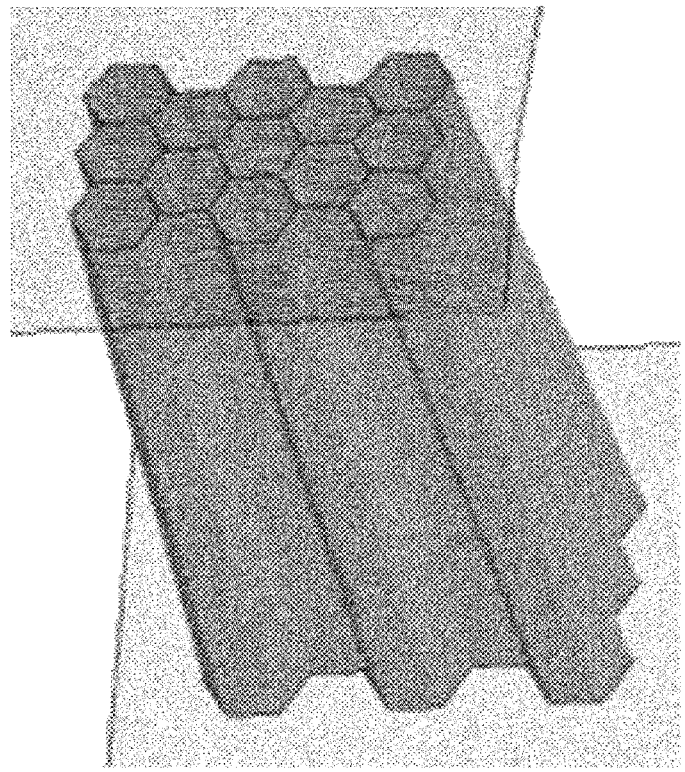
FIG. 14 is a perspective view showing a structure of a crash box according to related art.
Figure 15:
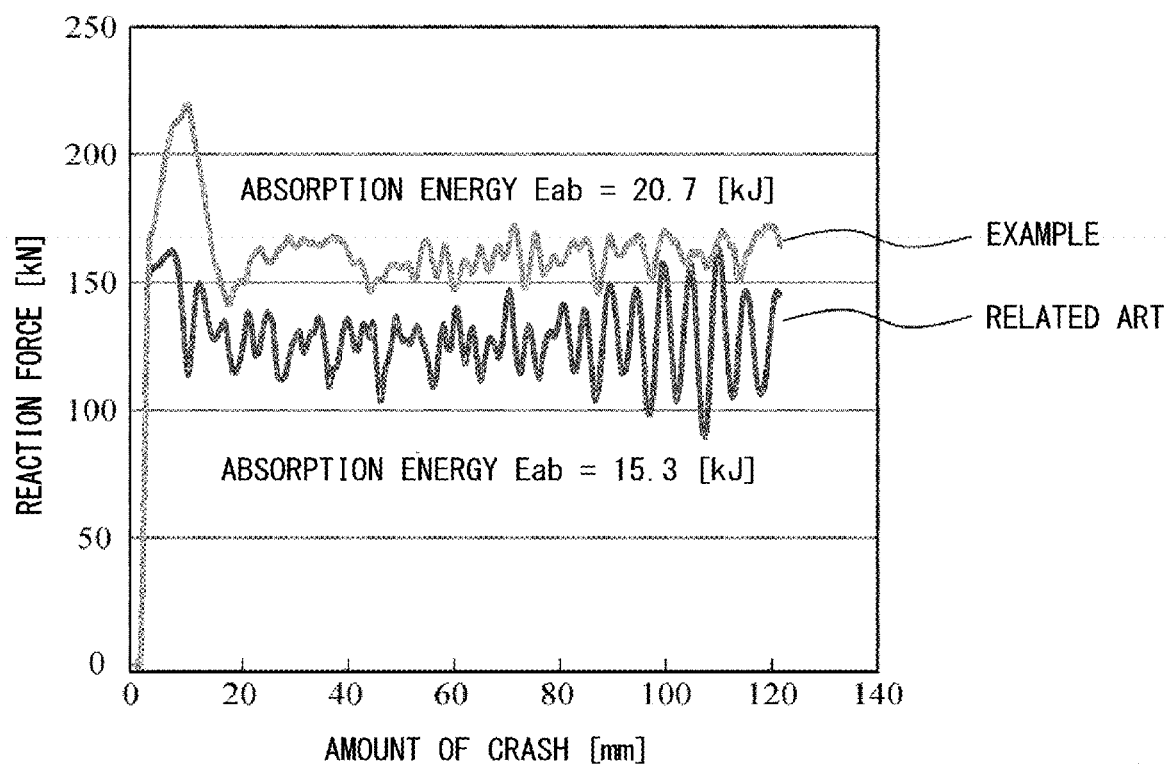
FIG. 15 shows a result of an analysis of absorption energy of crash boxes according to an example and related art by using CAE.

Next, absorption energy, that is, impact energy that the crash box 1A according to this example absorbs is described in comparison with related art with reference to FIGS. 14 and 15. FIG. 14 is a perspective view showing a structure of a crash box 90 according to related art. FIG. 15 shows a result of an analysis of absorption energy of a crash box 1A according to this example and that of a crash box 90 according to related art by using CAE. Note that FIG. 15 corresponds to a graph showing amounts of crush [mm] of the crash boxes 1A and 90 when a weight of 1 [t] is dropped from above at a speed of 50 [km] per hour, in which a horizontal axis indicates reaction forces [kN] and a vertical axis indicates the amounts of crush [mm].

As shown in FIG. 14, all of a plurality of cylindrical bodies (13 bodies in FIG. 14) forming the crash box 90 according to related art have a uniform void ratio (about 3%). Note that other structures of the crash box 90, including the overall size of the crash box 90, are similar to those of the crash box 1A according to this example.

As shown in FIG. 15, the crash box 1A according to this example exhibits a higher reaction force in comparison with that of the crash box 90 according to the related art, even when though have the same amount of crush. Further, when absorption energy is calculated from the result of this graph, the absorption energy of the crash box 1A according to this example is 20.7 [kJ], in contrast to 15.3 [kJ] of the crash box 90 according to the related art. Thus, the crash box 1A according to this example can secure an amount of absorption energy about 1.5 times as large as that of the crash box 90 according to the related art and thereby absorb impact energy more reliably than the crash box 90 according to the related art.

Note that the present disclosure is not limited to the above described embodiments and various modifications can be made without departing from the spirit of the present disclosure. For example, although a laser is used for manufacturing a crash box in the above described embodiments, it is not limited to a laser. That is, those that can locally input heat such as an electron beam may be used.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A crash box comprising:
   a first plurality of layers, each layer of the first plurality of layers being made of a first metal; and
   a second plurality of layers, each layer of the second plurality of layers having a larger void ratio than that of the first metal, and the first plurality of layers and second plurality of layers being disposed in an alternating arrangement such that each layer of the first plurality of layers is adjacent to a layer of the second plurality of layers in an axial direction of the crash box,
   wherein the first plurality of layers and second plurality of layers are configured so that at least a part of the crash box is deformed in an axial direction and thereby absorbs impact energy, when the crash box receives an impact in the axial direction,
   wherein each of the first plurality of layers and each of the second plurality of layers are integrally formed with each other,
   wherein the crash box is configured to be mounted on a front or rear part of a vehicle in a position so that the axial direction of the crash box is parallel to a longitudinal direction of the vehicle, and
   wherein at least one layer of the second plurality of layers has a larger void ratio than at least one other layer of the second plurality of layers, the at least one other layer being closer to a center of the vehicle than the at least one layer.

2. The crash box according to claim 1, wherein at least one layer of the second plurality of layers is disposed between two layers of the first plurality of layers.

3. The crash box according to claim 1, wherein
   each layer of the first plurality of layers is disposed adjacent to at least one layer of the second plurality of layers, and
   each layer of the second plurality of layers is adjacent to at least one layer of the first plurality of layers.

4. The crash box according to claim 1, wherein the first plurality of layers and second plurality of layers are arranged such that when the crash box receives the impact in the axial direction the first and second plurality of layers deform into a bellows shape.

5. A crash box comprising:
   at least one first layer made of a first metal and at least two second layers, each of the two second layers having a larger void ratio than the first metal, the at least one first layer and the at least two second layers being disposed in an alternating arrangement such that the at least one first layer in disposed between and adjacent to each of the at least two second layers in an axial direction of the crash box,
   wherein the at least one first layer and the at least two second layers are configured so that a part of the crash box is deformed in an axial direction and thereby absorbs impact energy when the crash box receives an impact in the axial direction,
   wherein the crash box is configured to be mounted on a front or rear part of a vehicle such that the axial direction of the crash box is parallel to a longitudinal direction of the vehicle, and
   wherein a first layer of the at least two second layers has a larger void ratio than a second layer of the at least two second layers, the second layer of the at least two second layers being closer to a center of the vehicle than the first layer of the at least two second layers.

* * * * *